United States Patent
Lang et al.

(10) Patent No.: US 8,061,924 B2
(45) Date of Patent: Nov. 22, 2011

(54) CLAMPING ELEMENT FOR CONNECTING A MOTOR SHAFT TO A TRANSMISSION VIA A HUB

(75) Inventors: Walter Lang, Igersheim (DE); Christof Old, Bad Mergentheim (DE)

(73) Assignee: Wittenstein AG, Igersheim (DE)

( * ) Notice: Subject to any disclaimer, the term of this patent is extended or adjusted under 35 U.S.C. 154(b) by 0 days.

(21) Appl. No.: 12/610,636

(22) Filed: Nov. 2, 2009

(65) Prior Publication Data

US 2010/0104358 A1    Apr. 29, 2010

Related U.S. Application Data

(63) Continuation of application No. 11/477,983, filed on Jun. 29, 2006, now abandoned.

(30) Foreign Application Priority Data

Jul. 6, 2005   (DE) .......................... 10 2005 031 839

(51) Int. Cl.
*F16B 2/06* (2006.01)
(52) U.S. Cl. .................... 403/379.3; 403/290; 403/344
(58) Field of Classification Search ............. 403/109.6, 403/290, 344, 378, 379.1, 379.3, 398, 399
See application file for complete search history.

(56) References Cited

U.S. PATENT DOCUMENTS

| | | | | |
|---|---|---|---|---|
| 111,152 A | * | 1/1871 | Smith | 403/312 |
| 1,687,806 A | * | 10/1928 | Strong | 384/480 |
| 3,851,983 A | * | 12/1974 | MacKenzie | 403/312 |
| 3,917,424 A | * | 11/1975 | Zugel | 403/287 |
| 4,019,824 A | * | 4/1977 | Percy | 403/261 |
| 4,428,697 A | * | 1/1984 | Ruland | 403/344 |
| 5,006,007 A | * | 4/1991 | Fischer et al. | 403/290 |
| 5,052,842 A | * | 10/1991 | Janatka | 403/14 |
| 5,067,845 A | * | 11/1991 | Schlueter | 403/344 |
| 5,154,652 A | * | 10/1992 | Ecklesdafer | 440/83 |
| 5,253,949 A | * | 10/1993 | Oxley et al. | 403/317 |
| 5,318,375 A | * | 6/1994 | Entrup et al. | 403/359.5 |
| 5,580,184 A | * | 12/1996 | Riccitelli | 403/365 |
| 5,628,578 A | * | 5/1997 | McClanahan et al. | 403/290 |
| 5,851,084 A | * | 12/1998 | Nishikawa | 403/344 |
| 6,413,006 B1 | * | 7/2002 | Neugart | 403/344 |
| 6,776,551 B2 | * | 8/2004 | Linnenbuerger | 403/90 |
| 7,300,210 B2 | * | 11/2007 | Johnson et al. | 384/537 |
| 7,448,821 B2 | * | 11/2008 | Meyer | 403/290 |

* cited by examiner

*Primary Examiner* — Joshua Kennedy
(74) *Attorney, Agent, or Firm* — Bachman & LaPointe, P.C.

(57) ABSTRACT

In the case of a clamping element for connecting a motor shaft to a transmission via a hub (3), in particular transmission component, such as transmission drive shaft, sun wheel, clutch or the like, with at least one fixing element (7) being inserted radially in the clamping element, the fixing element (7) is at the same time to form both a tangential element for securing the clamping element ($R_1$, $R_2$) against rotation and an axial element for securing the clamping element ($R_1$, $R_2$) with respect to the hub (3).

9 Claims, 3 Drawing Sheets

CLAMPING ELEMENT FOR CONNECTING A MOTOR SHAFT TO A TRANSMISSION VIA A HUB

CROSS-REFERENCE TO RELATED APPLICATION

This is a continuation application of Ser. No. 11/477,983, filed Jun. 29, 2006, and entitled CLAMPING ELEMENT FOR CONNECTING A MOTOR SHAFT TO A TRANSMISSION VIA A HUB, now abandoned.

BACKGROUND OF THE INVENTION

The present invention relates to a clamping element for connecting a motor shaft to a transmission via a hub, in particular transmission component, such as transmission drive shaft, sun wheel, clutch or the like, with at least one fixing element being inserted radially in the clamping element.

Clamping elements of this type are known and customary on the market in extremely diverse forms and designs.

They are used in particular as shaft-hub connections and transmit driving torques from, for example, a motor to a transmission.

A disadvantage of the previous clamping elements is that a clamping ring frequently slips and cannot be easily fixed.

The present invention is therefore based on the object of providing a clamping element of the type mentioned at the beginning which eliminates the above-mentioned disadvantages, with which fixing is facilitated, very high fixing forces are realized and which can be connected directly into a hub.

SUMMARY OF THE INVENTION

The object is achieved by providing a clamping element for connecting a motor shaft to a transmission via a hub, in particular transmission component, such as transmission drive shaft, sun wheel, clutch or the like, with at least one fixing element being inserted radially in the clamping element ($R_1$, $R_2$), characterized in that the fixing element at the same time forms a radial means of securing the clamping element ($R_1$, $R_2$) against rotation and an axial means of securing the clamping element ($R_1$, $R_2$) with respect to the hub. The object is further provided by clamping element for connecting a motor shaft to a transmission via a hub, in particular transmission component, such as transmission drive shaft, sun wheel, clutch or the like, with at least one fixing element being inserted radially in the clamping element ($R_1$, $R_2$), characterized in that the clamping element ($R_1$, $R_2$) forms an elastically deformable region over at least one hole, which region is arranged approximately opposite a gap of the clamping element ($R_1$, $R_2$) and at the same time the at least one hole forms a mass balance for the unbalanced mass arising because of the gap and the fixing element.

It is of particular importance in the present invention that a fixing element, which can be designed as a fastening element, as a screw, as an eccentric etc. or the like, acts upon a basic body with a radial gap in such a manner that its inside diameter tapers for fixing purposes.

In this case, it has proven particularly advantageous to allow the fixing element within the circumferential surface 6 to protrude out, with the fixing element correspondingly aligning with a recess, an opening of a through hole or the like of the hub. By this means, the clamping element sits on a hub in a manner secure against rotation and secure against slipping axially.

In addition, the clamping element sits in the end-side flange region of the hub in a secure and slip-proof manner, and cannot be rotated radially with respect to the hub or slip off the latter axially.

This substantially facilitates the tightening of the fixing element, in particular the screw, so as to taper the inside diameter of the clamping element.

In addition, a recess and/or at least one hole is preferably provided in the basic body in the region opposite the fixing element and the gap, in order to provide a mass balance with respect to the fixing element which sits in a hole. This forms a clamping element which is balanced and at the same time, by means of the recess and by means of the hole, has an elastically deformable region which substantially facilitates a pushing together or fixing of the basic body in order to reduce its inner diameter.

In particular the simultaneous radial and axial securing of the clamping element with respect to the hub and the provision of a mass balance while simultaneously reducing the necessary fixing forces, in order to more easily push the clamping element together, form a clamping element which can be produced very cost-effectively, can be operated easily and can be produced with reduced weight.

A further advantage of the present invention is that the hub, in an end region opposite the flange region, can be designed directly as transmission component, in particular as transmission drive shaft or even as sun wheel or else pinion, which is inserted directly in the transmission.

Then all that is necessary is for the drive shaft of the motor, in particular of the electric motor, to be inserted into the transmission or into the hub of the transmission and to be secured by means of the clamping element.

BRIEF DESCRIPTION OF THE DRAWINGS

Further advantages, features and details of the invention emerge from the description below of preferred exemplary embodiments and with reference to the drawing, in which.

DETAILED DESCRIPTION

Figure 1A:
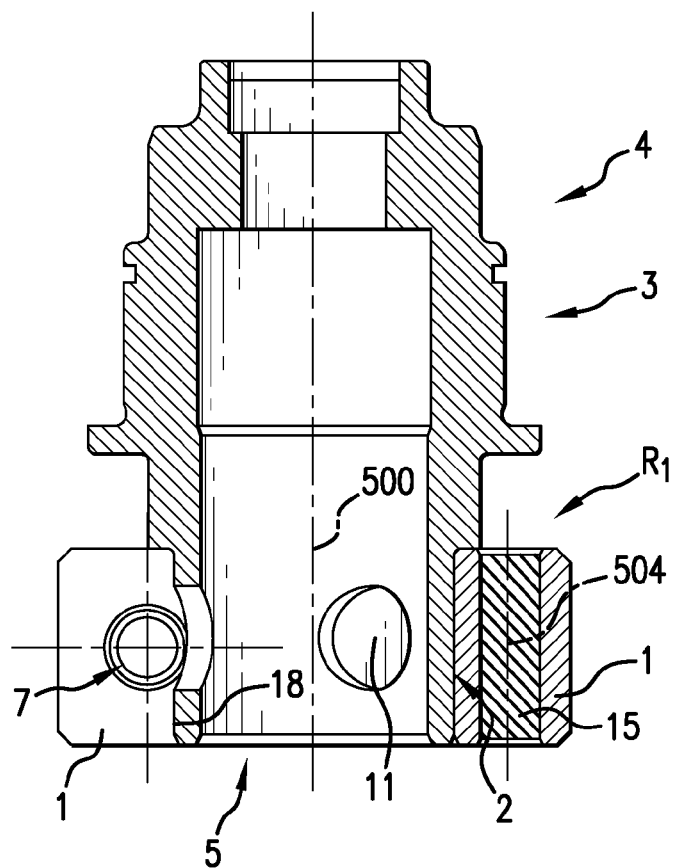
FIG. 1a shows a longitudinal section through the clamping element placed onto an end-side flange region of a hub.
Figure 1B:
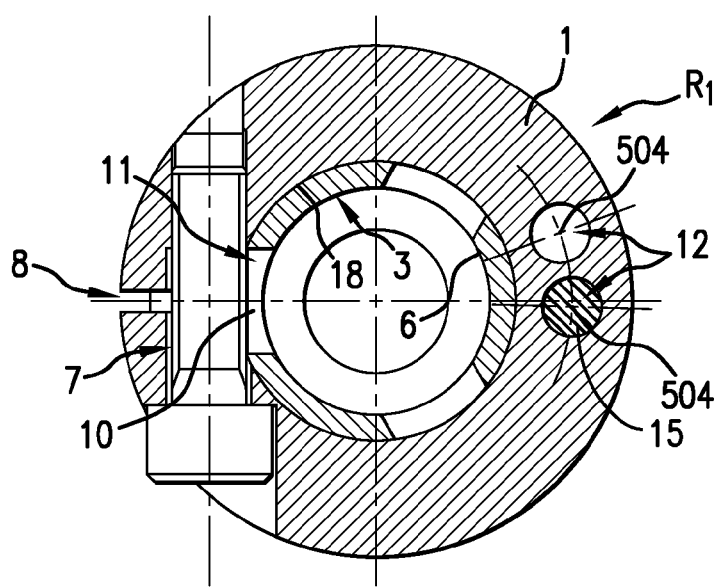
FIG. 1b shows a cross section through the clamping element, which is placed onto the hub, with the fixing element inserted.

According to FIGS. 1a and 1b, a clamping element $R_1$ according to the invention has a basic body 1 which is designed in the manner of a circular ring and sits in a precisely fitting manner on an end-side flange region 2 of a hub 3.

Figure 3:
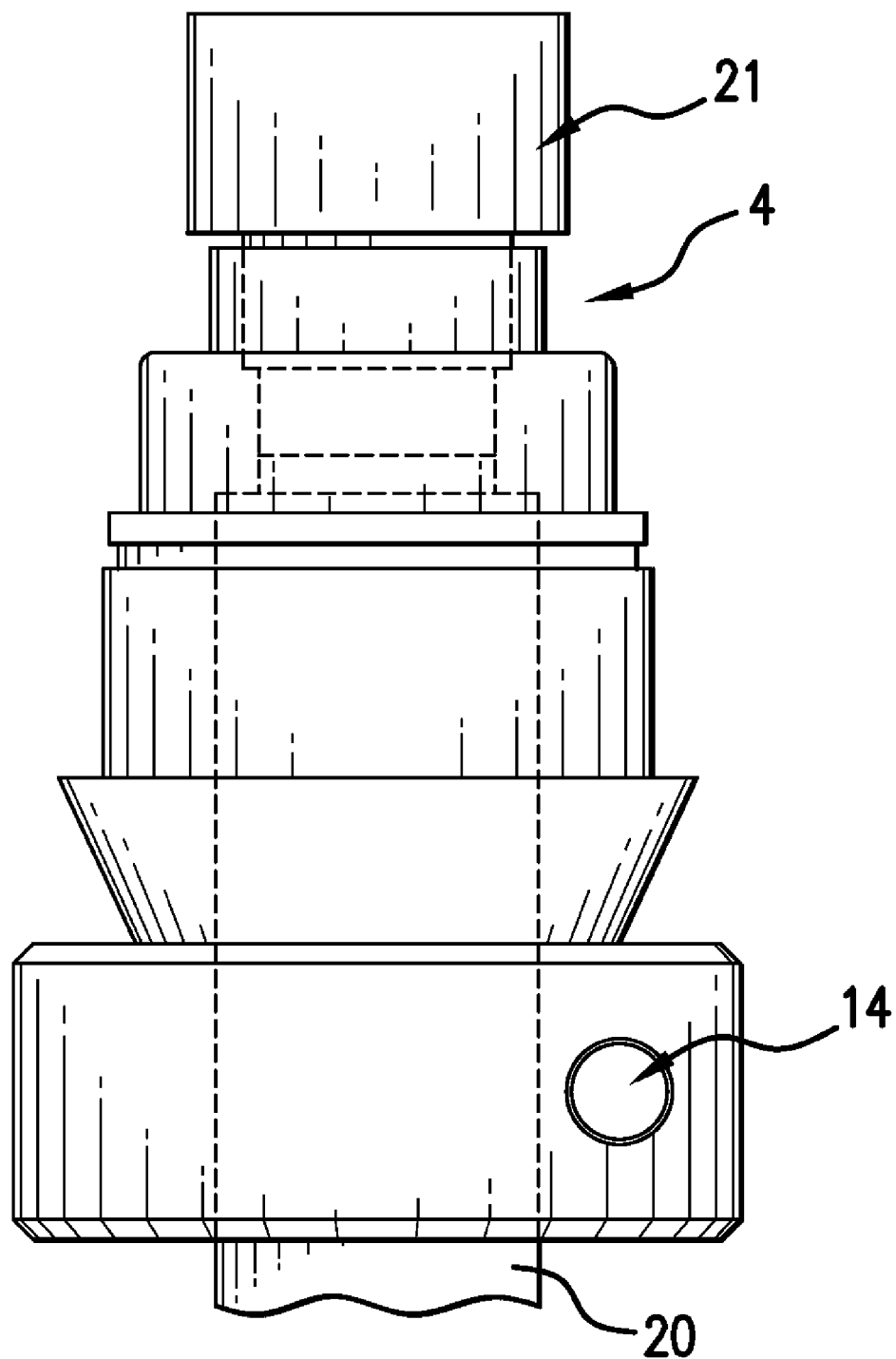
FIG. 3 is a side view of the clamping element and hub on a motor shaft.

At the other end, the hub 3 can be connected directly or indirectly to a transmission, an end region 4 opposite the flange region 2 preferably being designed as transmission component, in particular transmission drive shaft, pinion, sun wheel or the like 21 (FIG. 3) and being integrated directly in a transmission. An output shaft of a motor, in particular an electric motor, can be inserted through an insertion opening 5 in a precisely fitting manner onto an inner circumferential surface 6 in order then to drive a transmission preferably directly via the hub 3.

So that the motor output shaft can be fixed securely and detachably again in the region of the flange region 2 of the hub 3, the actual inventive clamping element $R_1$ sits on the flange region 2.

In the present exemplary embodiment, in FIGS. 1a and 1b, by means of the clamping element $R_1$, by the basic body 1 being fixed by means of a fixing element 7, the clamping element $R_1$, in particular the basic body 1 thereof, can be pressed together about a gap 8 and thereby fixedly clamps the flange-side region 2 of the hub 3 and therefore, for example, a motor output shaft inserted into the insertion opening 5.

In this case, it has proven advantageous in the present invention that, in order to secure the clamping element $R_1$ against rotation with respect to the hub 3 and at the same to axially secure the clamping element $R_1$ against sliding down off the flange region 2 of the hub 3, the fixing element 7 protrudes out of an inner circumferential surface 18 of the clamping element (but, in the illustrated embodiment not reaching the inner circumferential surface 6 of the hub 3) and interacts with and is in engagement with at least one recess 9 and/or an opening region 10 of a through hole 11 of the hub 3 in such a manner that an axial means of securing the clamping element $R_1$ with respect to the hub 3 and at the same time a means of securing the clamping element $R_1$ against rotation with respect to the hub 3 is ensured.

The fixing (e.g., clamping) element 7 is preferably a threaded screw which is inserted in an eccentric hole (e.g., having an axis 502 tangentially oriented off-center to the common central longitudinal axis 500 of the body 1 and hub 3) 14 on the basic body 1 and presses the gap 8 together.

By corresponding tightening of the fixing element 7, an inside diameter of the basic body 1 can be reduced for fixing or clamping it with respect to the hub 3.

Figure 2A:
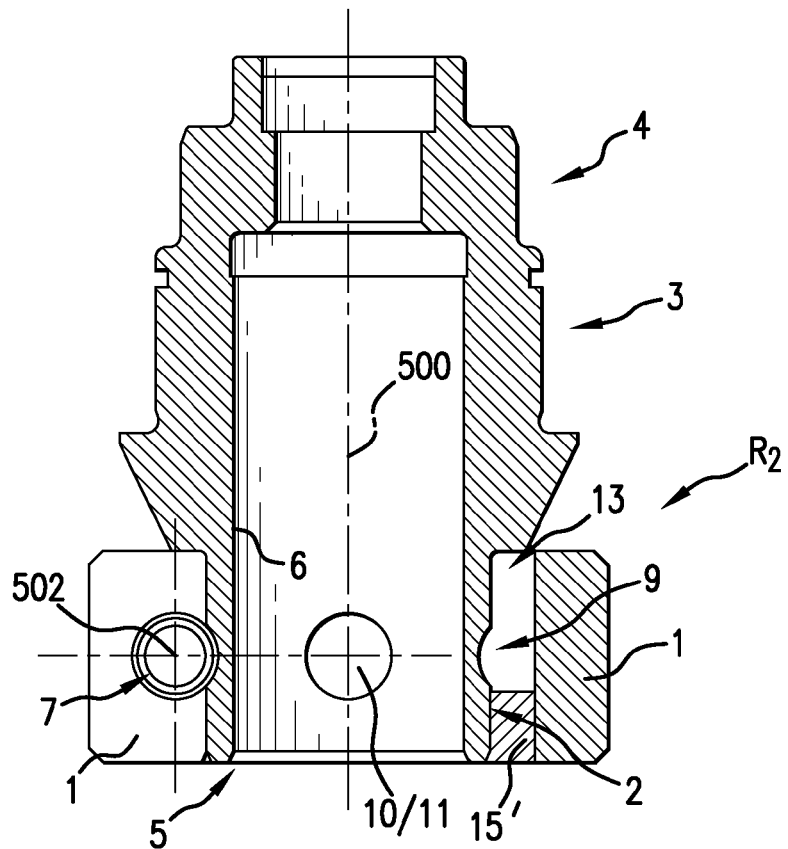
FIG. 2a shows a longitudinal section through a further exemplary embodiment of a clamping element placed onto an end-side flange region of a hub.
Figure 2B:
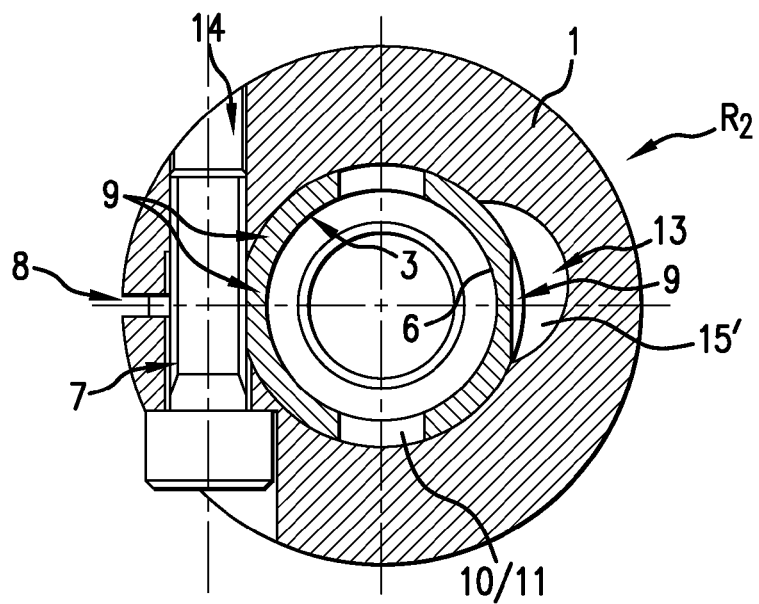
FIG. 2b shows a cross section through the clamping element placed onto the hub.

In order to facilitate an elastic deformation of the basic body 1, as illustrated in FIG. 1b, at least one hole 12 is preferably provided, approximately opposite the gap 8, or as illustrated in FIGS. 2a and 2b, a recess 13 is provided in order to provide an elastic region in the basic body 1, so that the clamping element $R_1$ can be pushed together more easily by means of the fixing element 7 in the region of the gap 8.

It is also important in the present invention that at least one hole 12 and the at least one recess 13 at the same time provide a mass balance of the clamping element $R_1$ and $R_2$ itself. At least one weight 15; 15' can be inserted into one of the at least one hole 12 and at least one recess 13 to balance the unbalanced mass so as to provide mass balance. The exemplary holes 12 are eccentric (e.g., have axes 504 off-center to the axis 500).

In this respect, the recesses 9 and the opening region 10 of through holes 11 in the hub 3 in the end-side flange region 2 can not only form means of securing rotationally and axially the clamping element $R_1$, $R_2$ but also serve to reduce the stiffness of the hub 3, in particular in the clamping region, in which a clamping and fixing of a motor output shaft 20 is to be carried out within the inner circumferential surface 6.

The clamping element $R_2$ according to FIGS. 2a and 2b differs only insubstantially from the clamping element $R_1$ according to FIGS. 1a and 1b. One difference is that, instead of the axial holes 12 in the basic body 1, the recess 13 in the basic body 1 is preferably provided on the inside in order to exactly provide a mass balance of the clamping element $R_2$ with the fixing element 7 inserted, and at the same time to facilitate a reduction of the inside diameter of the basic body 1 for the purpose of fixing a motor shaft.

The invention claimed is:

1. Clamp system for connecting a motor shaft to a transmission, the clamp system comprising a hub (3) and at least one fixing element (7) inserted tangentially in a clamping element ($R_1$, $R_2$), wherein:
    the clamping element ($R_1$, $R_2$) forms an elastically deformable region over one of at least one hole (12) or at least one recess (13);
    the deformable region is arranged approximately opposite a gap (8) of the clamping element ($R_1$, $R_2$);
    one of the at least one hole (12) and/or one recess (13) forms a mass balance for an unbalanced mass arising because of the gap (8) and the fixing element (7);
    the fixing element (7) extends tangentially through the clamping element ($R_1$, $R_2$) and at least slightly radially protrudes out of an inner circumferential surface (18) of the clamping element;
    at least one hole (12) or recess (13) is provided opposite the gap (8);
    the hole or recess is used for the mass balance and simultaneous formation of an elastically deformable region in order to elastically deform the clamping element ($R_1$, $R_2$) in a tangential direction by means of the fixing element (7); and
    the system further comprises at least one weight (15; 15') in one of the at least one hole (12) and at least one recess (13) to balance an unbalanced mass so as to provide mass balance.

2. Clamp system according to claim 1, wherein the hub (3) comprises a sleeve having at least one recess (9) or through hole (11).

3. Clamp system according to claim 2, wherein the at least one recess (9) or through hole (11) of the hub (3) is provided in a flange region (2).

4. Clamp system according to claim 3, wherein the clamping element ($R_1$, $R_2$) can be put onto the flange region (2) of the hub (3) and, after the clamping element ($R_1$, $R_2$) is put onto the flange region (2) of the hub (3), the fixing element (7) comes into engagement with the recess (9) or the through hole (11/10) in an aligned manner in order to form a means for securing the clamping element ($R_1$, $R_2$) axially and against rotation with respect to the hub (3).

5. Clamp system according to claim 4, wherein the fixing element (7) engages in a tangential, eccentric hole (14) of the clamping element ($R_1$, $R_2$) and, on one side of the gap (8), is mounted in a freely rotatable manner and, on the other side is in engagement with said clamping element via a thread.

6. Clamp system according to claim 3, wherein a basic body (1) sits on an end side in the flange region (2) on the hub (3) with a precise fit such that it can be detached, the hub (3) produces a connection between a transmission and engine, and, in the region of the clamping element ($R_1$, $R_2$), an engine shaft can be fixed within the hub (3) and detached again.

7. Clamp system according to claim 1, wherein the fixing element (7) is a conventional screw and extends tangentially through the clamping element ($R_1$, $R_2$) in the region of the gap (8).

8. Clamp system according to claim 1, wherein the hub (3) at one end in an end region (4) is formed indirectly with a transmission drive shaft or sun wheel.

9. Clamp system according to claim 8, wherein at least one part of the hub (3) is formed as a pinion or sun wheel, and an other part of the hub (3) has, on an end side, a flange region (2) for receiving an output shaft of a motor on which the clamping element ($R_1$, $R_2$) sits with the fixing element (7) integrated in it for the fixing of the motor output shaft.

* * * * *